(12) United States Patent
Kawai

(10) Patent No.: US 10,439,199 B2
(45) Date of Patent: Oct. 8, 2019

(54) ELECTROCHEMICAL DEVICE ELECTRODE AND METHOD FOR MANUFACTURING ELECTROCHEMICAL DEVICE ELECTRODE

(71) Applicant: TAIYO YUDEN CO., LTD., Taito-ku, Tokyo (JP)

(72) Inventor: Yuki Kawai, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 123 days.

(21) Appl. No.: 15/470,654

(22) Filed: Mar. 27, 2017

(65) Prior Publication Data

US 2017/0352866 A1    Dec. 7, 2017

(30) Foreign Application Priority Data

Jun. 2, 2016    (JP) .................................. 2016-111228

(51) Int. Cl.
*H01M 4/131*    (2010.01)
*H01M 4/1391*    (2010.01)
(Continued)

(52) U.S. Cl.
CPC ............. *H01M 4/131* (2013.01); *C23C 22/66* (2013.01); *H01G 11/28* (2013.01); *H01G 11/46* (2013.01); *H01M 4/0404* (2013.01); *H01M 4/0416* (2013.01); *H01M 4/13* (2013.01); *H01M 4/139* (2013.01); *H01M 4/1391* (2013.01); *H01M 4/661* (2013.01); *H01M 10/052* (2013.01); *H01M 2004/021* (2013.01); *Y02E 60/13* (2013.01)

(58) Field of Classification Search
CPC ........ H01M 4/13; H01M 4/131; H01M 4/661; H01M 2004/021; H01M 10/052; H01G 11/28; H01G 11/46; C23C 22/66
See application file for complete search history.

(56) References Cited

U.S. PATENT DOCUMENTS

2013/0003260 A1* 1/2013 Kondou ................. H01G 11/28
361/508

FOREIGN PATENT DOCUMENTS

CN    101276901 A    10/2008
CN    101290984 A    10/2008
(Continued)

OTHER PUBLICATIONS

A First Office Action issued by the State Intellectual Property Office of China dated Jul. 23, 2018 for Chinese counterpart application No. 201710167132.7.
(Continued)

*Primary Examiner* — Brittany L Raymond
(74) *Attorney, Agent, or Firm* — Law Office of Katsuhiro Arai

(57) ABSTRACT

An electrochemical device electrode pertaining to one mode of the present invention has a current collector, an aluminum oxide layer, a conductive layer, and an active material layer. The current collector is an aluminum foil. The aluminum oxide layer is formed on a principle surface of the current collector and contains aluminum hydroxide and aluminum oxide. The conductive layer is formed on the aluminum oxide layer and contains conductive material, while the active material layer is formed on the conductive layer.

8 Claims, 9 Drawing Sheets

(51) Int. Cl.
*H01M 4/04*    (2006.01)
*H01G 11/28*   (2013.01)
*H01G 11/46*   (2013.01)
*H01M 10/052*  (2010.01)
*C23C 22/66*   (2006.01)
*H01M 4/13*    (2010.01)
*H01M 4/139*   (2010.01)
*H01M 4/66*    (2006.01)
*H01M 4/02*    (2006.01)

(56) References Cited

FOREIGN PATENT DOCUMENTS

| | | | |
|---|---|---|---|
| CN | 102203993 | A | 9/2011 |
| JP | H1167277  | A | 3/1999 |
| JP | 2000048822 | A | 2/2000 |
| JP | 2006073212 | A | 3/2006 |
| JP | 2007227733 | A | 9/2007 |
| JP | 2008103132 | A | 5/2008 |
| JP | 2008257991 | A | 10/2008 |
| JP | 2011228684 | A | 11/2011 |
| JP | 2014211960 | A | 11/2014 |
| JP | 2015109214 | A | 6/2015 |

OTHER PUBLICATIONS

Lu et al., Thermal Stability of Atomic Layer Deposition Al2O3 Thin Films, Journal of Inorganic Materials, Sep. 2006, 1217-1222, vol. 21, No. 5.
A Notification of Reasons for Refusal issued by the Japanese Patent Office, dated Nov. 27, 2018, for related Japanese application No. 2016-111228. (9 pages).

* cited by examiner

FIG. 9

|  | Initial ESR (mΩ) | Rise in ESR after acceleration test (%) |
|---|---|---|
| Example α | 163 | 450 |
| Comparative Example β | 207 | 580 |

ELECTROCHEMICAL DEVICE ELECTRODE AND METHOD FOR MANUFACTURING ELECTROCHEMICAL DEVICE ELECTRODE

BACKGROUND

Field of the Invention

The present invention relates to an electrochemical device electrode that contains a current collector and an active material layer, as well as a method for manufacturing such electrochemical device electrode.

DESCRIPTION OF THE RELATED ART

Electrical double-layer capacitors and other electrochemical devices may use a current collector that contains aluminum, and a conductive layer may be provided between the current collector and the active material layer for the purpose of lowering the resistance between the current collector and the active material layer. With such electrochemical devices, how the resistance between the current collector and the active material layer is lowered becomes important.

In Patent Literature 1, for example, an anchor coat layer constituted by phosphorus compound is provided between a current collector and an active material layer. It is claimed that providing the anchor coat layer between the current collector and the active material layer causes hydrogen bonding of the phosphorus component in the anchor coat layer with the active material layer, thereby improving the adhesion of the current collector and the active material layer. It is further claimed that, as a result of this, the resistance between the current collector and the active material layer drops.

Also, in Patent Literature 2, corona discharge treatment is provided on the surface of a current collector and then water is attached to the surface of the current collector, to form a protective layer containing oxyhydroxide on the surface of the current collector. It is claimed that, as a result of this, the anchor coat layer underneath the active material layer is partially embedded in the protective layer, and the resistance between the current collector and the active material layer drops.

BACKGROUND ART LITERATURES

[Patent Literature 1] Japanese Patent Laid-open No. 2007-227733
[Patent Literature 2] Japanese Patent Laid-open No. 2011-228684

SUMMARY

However, the resistivity of phosphorus (P) contained in such phosphorus compound is relatively high. As a result, the resistance between the current collector and the active material layer may rise. Also, in the process of attaching water to the current collector after the current collector has undergone corona discharge, production of oxyhydroxide on the current collector surface may vary, in which case the resistance between the current collector and the active material layer will also vary.

In light of the aforementioned situations, an object of the present invention is to provide an electrochemical device electrode exhibiting lower resistance between its active material layer and current collector, as well as a method for manufacturing such electrochemical device electrode.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, an electrochemical device electrode pertaining to one mode of the present invention has a current collector, an aluminum oxide layer, a conductive layer, and an active material layer.

The current collector is an aluminum foil.

The aluminum oxide layer is formed on a principle surface of the current collector and contains aluminum hydroxide and aluminum oxide.

The conductive layer is formed on the aluminum oxide layer and contains conductive material, while the active material layer is formed on the conductive layer.

According to the electrochemical device electrode pertaining to the present invention, the adhesion between the aluminum oxide layer provided on the principle surface of the current collector, and the conductive layer, improves. As a result, the resistance between the active material layer provided on the conductive layer, and the current collector, drops.

According to an infrared absorption spectrum of the aluminum oxide layer with a wave number of 1300 $cm^{-1}$ or less, the peak of absorption (or valley of transmission) due to aluminum oxide may be at least twice as high as, but no higher than six times, the absorption peak due to aluminum hydroxide.

Aluminum oxide and aluminum hydroxide coexist in the aluminum oxide layer (in an embodiment, both are simultaneously co-generated as the layer is being formed). As a result of this, the affinity of the conductive layer and the aluminum oxide layer increases, and the adhesion between the conductive layer and the aluminum oxide layer improves. Depending on the embodiment, the aluminum oxide layer comprises, consists essentially of, or consists of aluminum oxide and aluminum hydroxide except that the layer may contain unavoidable impurities and/or a material from the neighboring layer(s)).

The aluminum oxide layer may have a thickness of 1 nm or more but no more than 2 μm.

This way, a thick aluminum oxide layer is formed on the principle surface of the current collector, and consequently the anchor effect of the aluminum oxide layer increases and the adhesion between the conductive layer and the aluminum oxide layer improves (a layer may be constituted by multiple sub-layers in some embodiments).

The aluminum oxide layer may be porous.

This way, the anchor effect of the aluminum oxide layer increases and the adhesion between the conductive layer and the aluminum oxide layer improves. Furthermore, the conductive layer is connected directly to the current collector via the aluminum oxide layer.

A method for manufacturing an electrochemical device electrode pertaining to one mode of the present invention includes a process of increasing the reactivity on the principle surface of the current collector which is an aluminum foil.

Alkaline solution is caused to come in contact with the principle surface of the current collector, to form an aluminum oxide layer containing aluminum hydroxide and aluminum oxide on the principle surface of the current collector.

Conductive material is applied on a principle surface of the aluminum oxide layer, and then the conductive material is dried, to form a conductive layer on the principle surface of the aluminum oxide layer.

An active material layer is formed on a principle surface of the conductive layer.

According to the manufacturing method of electrochemical device electrode pertaining to the present invention, the adhesion between the aluminum oxide layer provided on the principle surface of the current collector, and the conductive layer, improves. As a result, the resistance between the active material layer and the current collector drops.

The aluminum oxide layer may be formed as a result of aqueous alkaline solution, in which carboxyl salt is dissolved, coming in contact with the current collector.

This way, the weak aqueous alkaline solution in which carboxyl salt is dissolved causes an aluminum oxide layer, which contains aluminum hydroxide and aluminum oxide, to be formed on the principle surface of the current collector.

For the conductive material, aqueous liquid in which a conductive substance is dispersed may be used.

Such aqueous liquid in which a conductive substance is dispersed, has good affinity with aluminum hydroxide and aluminum oxide. This means that, once the aqueous liquid in which a conductive substance is dispersed, is applied on the aluminum oxide layer, the contact area between the aqueous liquid and the aluminum oxide layer will improve.

As described above, an electrochemical device exhibiting lower resistance between its active material layer and current collector, as well as a method for manufacturing such electrochemical device electrode, are realized according to the present invention.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 9 is a table showing an ESR (equivalent series resistance) comparison.

DESCRIPTION OF THE SYMBOLS

Figure 1:
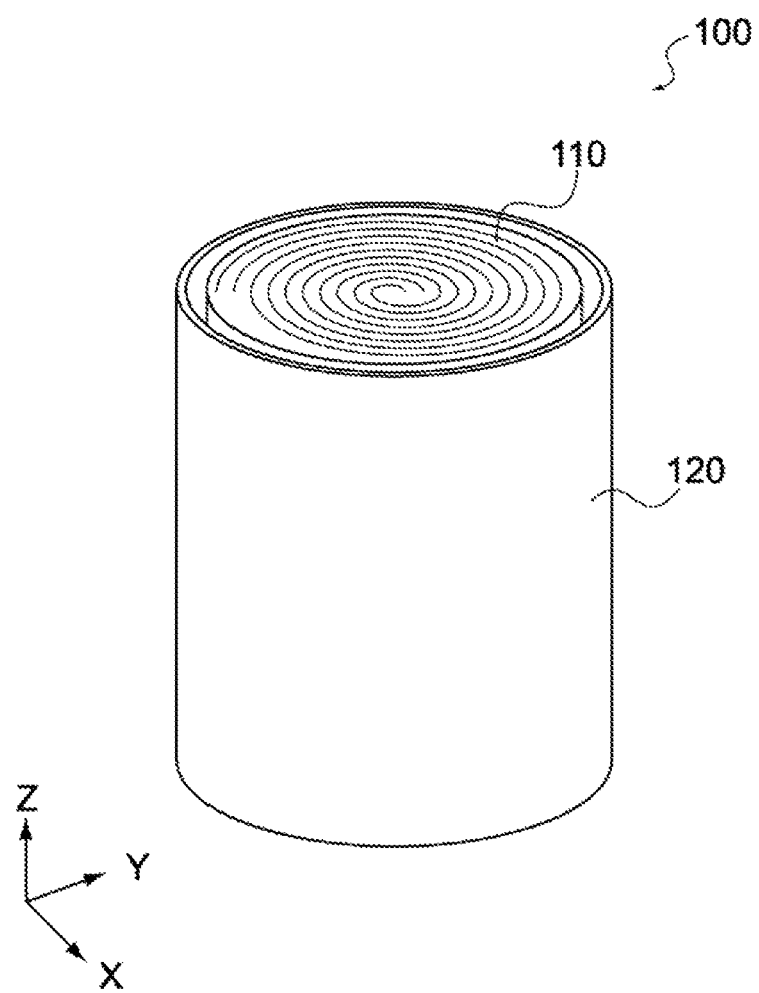
FIG. 1 is a perspective view of an electrochemical device pertaining to an embodiment of the present invention.

100—Electrochemical device
110—Electric storage element
120—Container
130—Negative electrode
131—Negative-electrode terminal
132—Negative-electrode collector
132$tr$—Treatment
132$s$—Principle face
133—Negative-electrode active material layer
135—Negative-electrode aluminum oxide layer
135$s$—Principle face
135$h$—Void
136—Negative-electrode conductive layer
136$s$—Principle face
140—Positive electrode
141—Positive-electrode terminal
142—Positive-electrode collector
143—Positive-electrode active material layer
145—Positive-electrode aluminum oxide layer
146—Positive-electrode conductive layer
150—Separator

DETAILED DESCRIPTION OF EMBODIMENTS

An embodiment of the present invention is explained below by referring to the drawings. It should be noted that, in the drawings, an XYZ-axis coordinate system may be introduced as necessary.

An electrochemical device 100 pertaining to this embodiment is explained. The electrochemical device 100 may be an electrical double-layer capacitor. Also, the electrochemical device 100 may be a lithium ion capacitor, lithium ion secondary battery, or other type of electrochemical device that can be charged/discharged.

[Configuration of Electrochemical Device]

FIG. 1 is a perspective view showing the configuration of the electrochemical device 100 pertaining to this embodiment.

The electrochemical device 100 shown in FIG. 1 is constituted by an electric storage element 110 housed in a container 120 (its lid and terminals are not illustrated). Together with the electric storage element 110, electrolytic solution (not illustrated) is also housed in the container 120.

Figure 2:
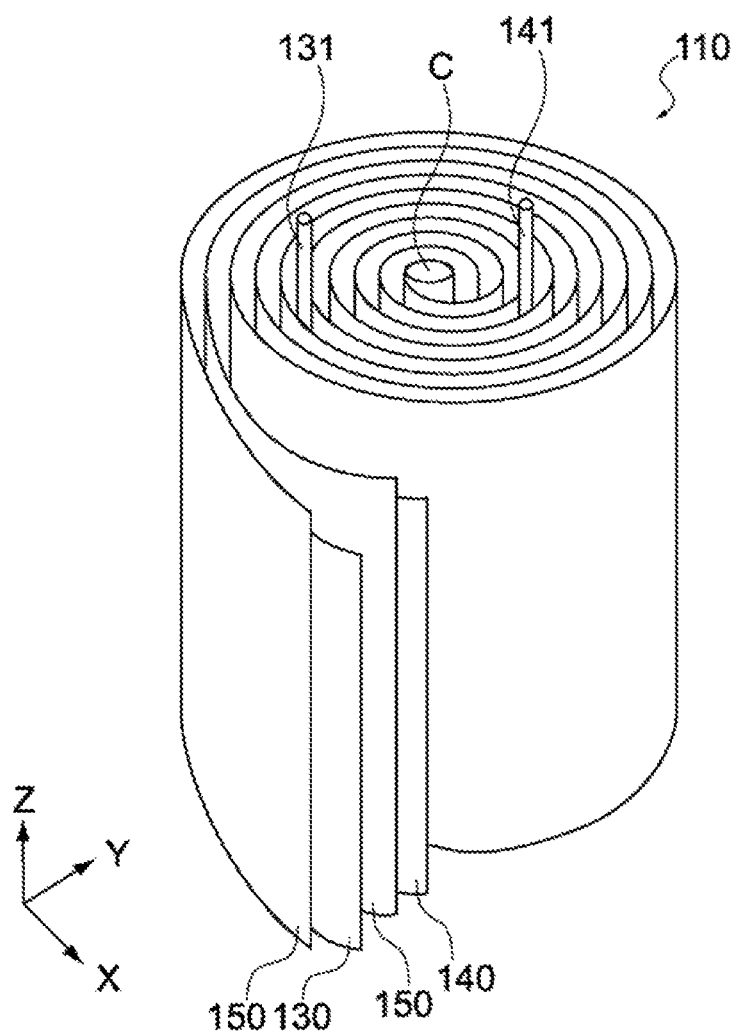
FIG. 2 is a perspective view of an electric storage element provided in the electrochemical device pertaining to an embodiment of the present invention.

FIG. 2 is a perspective view of the electric storage element 110.

As shown in FIG. 2, the electric storage element 110 has a negative electrode 130, a positive electrode 140, and separators 150, all of which are stacked together into a laminate which is then wound around a winding core C. The direction in which the winding core C extends, or specifically the direction parallel with the center axis of winding, is hereinafter referred to as the Z direction. The X direction represents the direction orthogonal to the Z direction, while the Y direction represents the direction orthogonal to the X direction and also to the Z direction. It should be noted that the winding core C may not always be provided. Also, the negative electrode 130 and positive electrode 140 may each be referred to as an electrochemical device electrode.

The negative electrode 130, positive electrode 140, and separators 150 constituting the electric storage element 110 may be stacked in the order of separator 150, negative electrode 130, separator 150, and positive electrode 140, toward the winding core C (from the outside of the winding), as shown in FIG. 2. The electric storage element 110 has a negative-electrode terminal 131 joined to the negative electrode 130, and a positive-electrode terminal 141 joined to the positive electrode 140. Both the negative-electrode terminal 131 and positive-electrode terminal 141 are led out to the outside of the electric storage element 110.

[Configuration of the Negative Electrode and Positive Electrode of an Electric Storage Element]

Figure 3:
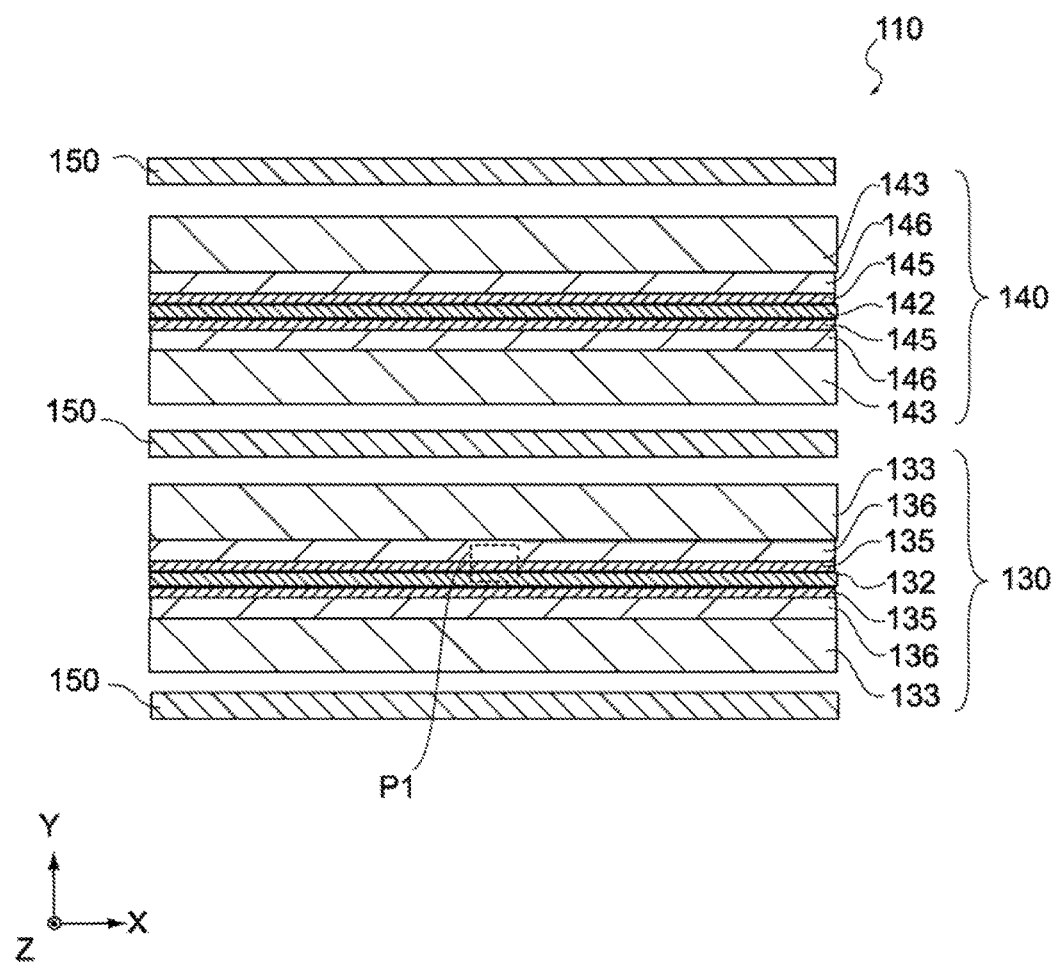
FIG. 3 is a cross sectional view of an electric storage element pertaining to an embodiment of the present invention.

FIG. 3 is a cross sectional view of the electric storage element 110.

While FIG. 3 shows that the negative electrode 130, positive electrode 140, and separators 150 of the electric storage element 110 are extending in parallel along the X-Z plane, the negative electrode 130, positive electrode 140, and separators 150 may be curved in a convex shape, as shown in FIG. 2.

The negative electrode 130 has a negative-electrode collector 132, negative-electrode aluminum oxide layers 135, negative-electrode conductive layers 136, and negative-electrode active material layers 133. In the example of FIG. 3, negative-electrode aluminum oxide layers 135, negative-electrode conductive layers 136, and negative-electrode active material layers 133, are provided on both principle faces of the negative-electrode collector 132; alternatively, a negative-electrode aluminum oxide layer 135, a negative-electrode conductive layer 136, and a negative-electrode active material layer 133, may be provided on one principle surface of the negative-electrode collector 132.

In the example of FIG. 3, the negative-electrode collector 132 is provided at the center of the negative electrode 130. The negative-electrode collector 132 is a metal foil. This metal foil is an aluminum foil, for example. Multiple through holes may be provided in the metal foil. The negative-electrode aluminum oxide layer 135 is provided on a principle surface of the negative-electrode collector 132. The negative-electrode collector 132 is sandwiched between the negative-electrode aluminum oxide layers 135 provided on both principle faces of the negative-electrode collector 132. The negative-electrode aluminum oxide layer 135 contains aluminum hydroxide and aluminum oxide, for example.

The negative-electrode conductive layer 136 is provided on the negative-electrode aluminum oxide layer 135. The negative-electrode conductive layer 136 is provided between the negative-electrode aluminum oxide layer 135 and the negative-electrode active material layer 133. In the example of FIG. 3, the negative-electrode collector 132 is sandwiched between the negative-electrode conductive layers 136 provided on both sides of the negative-electrode collector 132. The negative-electrode conductive layer 136 contains conductive material. This conductive material is at least one type of material selected from carbon black and graphite, for example.

The negative-electrode active material layer 133 is provided on the negative-electrode conductive layer 136. In the example of FIG. 3, the negative-electrode collector 132 is sandwiched between the negative-electrode active material layers 133 provided on both sides of the negative-electrode collector 132. The negative-electrode active material layer 133 is a substance that causes the electrolyte ions (such as $BF_4^-$) to be adsorbed onto the surface of the negative-electrode conductive layer 136 to form electrical double layers. The negative-electrode active material layer 133 contains active material. For the active material, at least one type of material selected from active carbon, PAS (polyacenic semiconductor), etc., is contained, for example. The negative-electrode active material layer 133 is made by rolling a mixture of the aforementioned active material with conductive auxiliary agent (such as Ketjenblack) and synthetic resin (such as PTFE (polytetrafluoroethylene)) into a sheet shape and then cutting the sheet.

For example, the negative-electrode active material layer 133 may have its negative-electrode active material mixed with binder resin, and it may further contain any conductive auxiliary agent.

The binder resin is a synthetic resin that joins the negative-electrode active material, and carboxy methyl cellulose, styrene butadiene rubber, polyethylene, polypropylene, polyethylene terephthalate, aromatic polyamide, carboxy methyl cellulose, fluororubber, polyvinylidene fluoride, isoprene rubber, butadiene rubber, ethylene propylene rubber, etc., may be used, for example.

The conductive auxiliary agent is constituted by particles made of conductive material, and improves the conductivity within the negative-electrode active material. The conductive auxiliary agent may be acetylene black, graphite, carbon black, or other carbon material, for example. Any one of the foregoing may be used alone, or two or more of them may be mixed together. It should be noted that the conductive auxiliary agent may be constituted by metal material, highly conductive polymer, etc., so long as the material used conducts electricity.

The positive electrode 140 has a positive-electrode collector 142, positive-electrode aluminum oxide layers 145, positive-electrode conductive layers 146, and positive-electrode active material layers 143. In the example of FIG. 3, positive-electrode aluminum oxide layers 145, positive-electrode conductive layers 146, and positive-electrode active material layers 143, are provided on both principle faces of the positive-electrode collector 142; alternatively, a positive-electrode aluminum oxide layer 145, a positive-electrode conductive layer 146, and a positive-electrode active material layer 143, may be provided on one principle surface of the positive-electrode collector 142.

In the example of FIG. 3, the positive-electrode collector 142 is provided at the center of the positive electrode 140. The material of the positive-electrode collector 142 may be the same as, or different from, the material of the negative-electrode collector 132. The positive-electrode collector 142 is sandwiched between the positive-electrode aluminum oxide layers 145 provided on both principle faces of the positive-electrode collector 142. The material of the positive-electrode aluminum oxide layer 145 may be the same as, or different from, the material of the negative-electrode aluminum oxide layer 135.

The positive-electrode conductive layer 146 is provided between the positive-electrode aluminum oxide layer 145 and the positive-electrode active material layer 143. For example, the positive-electrode collector 142 is sandwiched between the positive-electrode conductive layers 146 provided on both sides of the positive-electrode collector 142. The material of the positive-electrode conductive layer 146 may be the same as, or different from, the material of the negative-electrode conductive layer 136.

The positive-electrode active material layer 143 is provided on the positive-electrode conductive layer 146. For example, the positive-electrode collector 142 is sandwiched between the positive-electrode active material layers 143 provided on both sides of the positive-electrode collector 142. The material of the positive-electrode active material layer 143 may be the same as, or different from, the material of the negative-electrode active material layer 133.

The separators 150 are provided between the negative electrode 130 and the positive electrode 140. The separators 150 are sheets that let the electrolyte ions pass through them, but insulate the negative electrode 130 and the positive electrode 140. The separators 150 may be porous sheets made of glass fibers, cellulose fibers, plastic fibers, etc.

Any electrolytic solution can be selected as desired. For example, the electrolytic solution may contain: lithium ions, tetraethyl ammonium ions, triethyl methyl ammonium ions, 5-azoniaspiro [4.4] nonane ions, ethyl methyl imidazolium ions, or other cations; $BF_4^-$ (tetrafluoroborate ions), $PF_6^-$ (hexafluorophosphate ions), $(CF_3SO_2)_2N^-$ (TFSA ions), or other anions; and propylene carbonate, ethylene carbonate, dimethyl carbonate, ethyl methyl carbonate, dimethyl carbonate, sulfolane, dimethyl sulfone, ethyl methyl sulfone, ethyl isopropyl sulfone, or other solvent. To be specific, a propylene carbonate solution of 5-azoniaspiro [4.4] nonane-$BF_4$ or ethyl methyl imidazolium-$BF_4$ may be used, for example.

Figure 4:
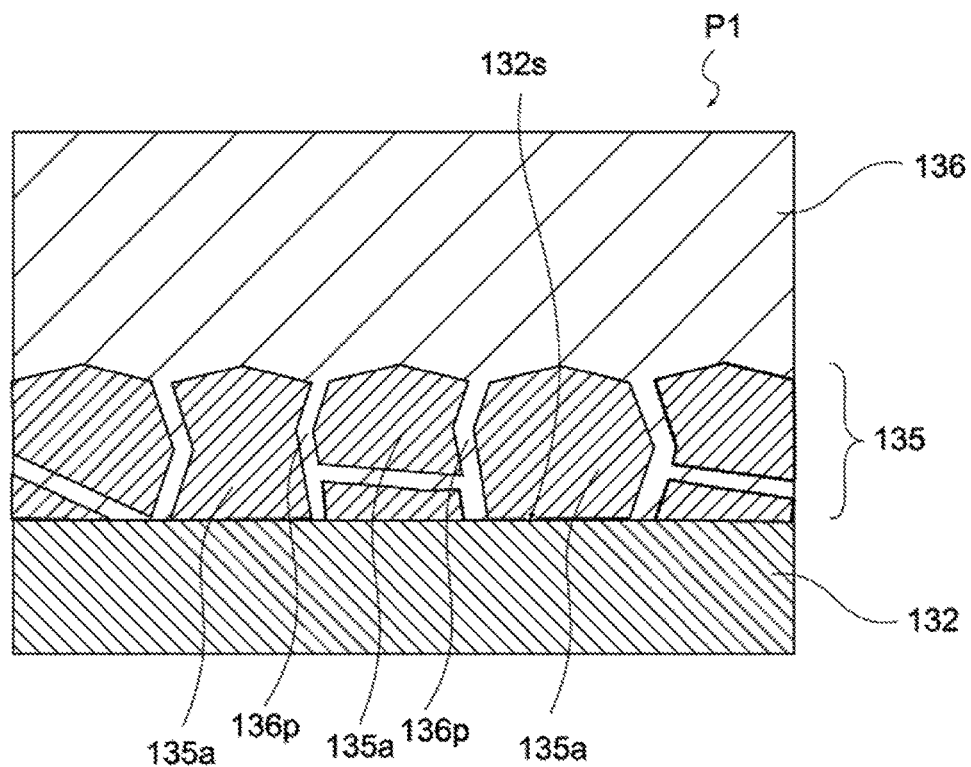
FIG. 4 is a partial, enlarged cross sectional view of the negative electrode illustrated in FIG. 3 pertaining to an embodiment of the present invention.

FIG. 4 is a partial, enlarged cross sectional view of the negative electrode 130. For example, FIG. 4 provides a schematic representation of the boxed area P1 in FIG. 3.

As shown in FIG. 4, the negative-electrode aluminum oxide layer 135 is formed on the principle surface 132s of the negative-electrode collector 132. Aluminum oxide and aluminum hydroxide coexist in the negative-electrode aluminum oxide layer 135. The film thickness of the negative-electrode aluminum oxide layer 135 is 1 nm or more but no more than 2 μm, for example.

Here, if the film thickness of the negative-electrode aluminum oxide layer 135 is less than 1 nm, the hydrophilicity will drop, which is not desirable. If the film thickness of the negative-electrode aluminum oxide layer 135 is greater than 2 μm, on the other hand, the current collector resistance will rise, which is not desirable, either. In the meantime, the negative-electrode aluminum oxide layer 135 is porous and contains multiple pieces of aluminum oxide 135a, for example.

Among the multiple pieces of aluminum oxide 135a, the adjacent pieces of aluminum oxide 135a may be apart from or in contact with each other. If the adjacent pieces of aluminum oxide 135a are apart from each other, a portion 136p of the negative-electrode conductive layer 136 is in direct contact with the negative-electrode collector 132, as shown in FIG. 4. Many such portions 136p exist in the negative electrode 130.

The positive-electrode aluminum oxide layer 145 in the positive electrode 140 is also porous, as its counterpart in the negative electrode 130 is, and portions of the positive-electrode conductive layer 146 are in direct contact with the positive-electrode collector 142.

[Method for Manufacturing a Negative Electrode and Positive Electrode]

Figure 5:
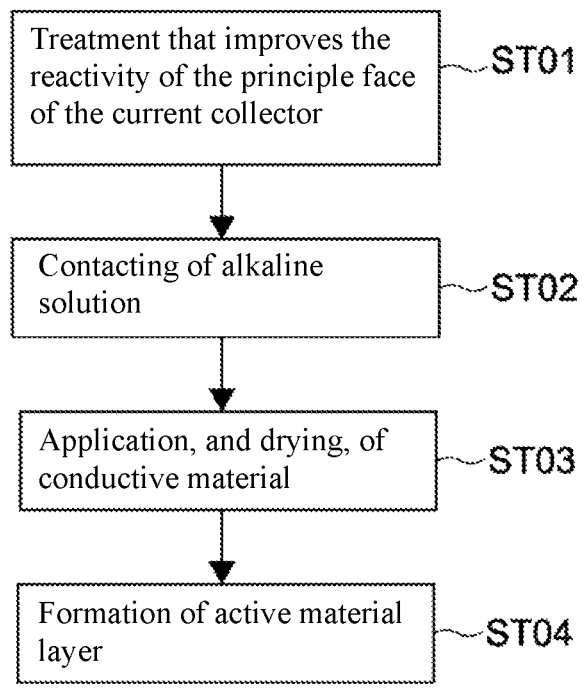
FIG. 5 is a flowchart showing a manufacturing process of an electrochemical device electrode pertaining to an embodiment of the present invention.

FIG. 5 is a flowchart showing a manufacturing process of an electrochemical device electrode.

Each of the steps shown in FIG. 5 is explained in detail using FIGS. 6A to 7B below.

FIGS. 6A to 7B are each a partial, enlarged cross sectional view showing the manufacturing process of electrochemical device electrode.

FIGS. 6A to 7B show, of the manufacturing process of the negative electrode 130 and that of the positive electrode 140, the manufacturing process of the negative electrode 130 as an example.

Figure 6A:
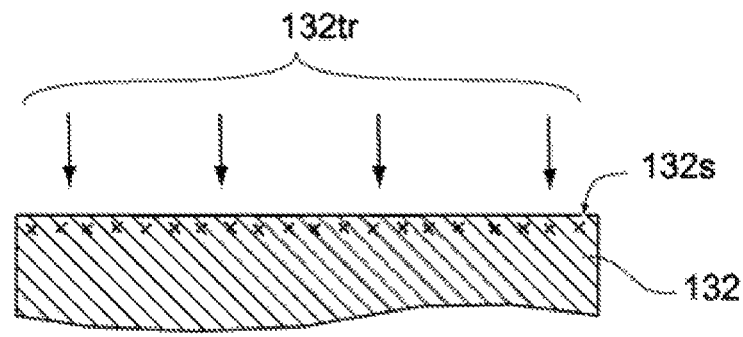
FIGS. 6A, 6B, and 6C are cross sectional views showing the manufacturing process of an electrochemical device electrode pertaining to an embodiment of the present invention.

For example, under the manufacturing method of electrochemical device electrode proposed by the present invention, a principle surface 132s of the negative-electrode collector 132 is treated to increase the reactivity of the principle surface 132s, as shown in FIG. 6A. For example, a treatment 132tr such as UV irradiation, corona discharge, plasma irradiation (atmospheric plasma, decompression plasma, etc.), electron beam irradiation, and ion beam irradiation, among others, is applied to the principle surface 132s of the negative-electrode collector 132 (ST01 of FIG. 5). This treatment 132tr activates the principle surface 132s of the negative-electrode collector 132. As a result, aluminum-oxygen bonds will break, or aluminum will become exposed at at least part of the surface, on the principle surface 132s of the negative-electrode collector 132, for example (in the figure, "xxxx . . . " represents an activated surface).

It should be noted that the negative-electrode collector 132 may be washed with organic solvent, cleaning agent, etc., before the treatment 132tr is applied to the negative-electrode collector 132. This way, any dust, oil, etc., attached to the negative-electrode collector 132, is removed before the treatment 132tr is applied.

Figure 6B:
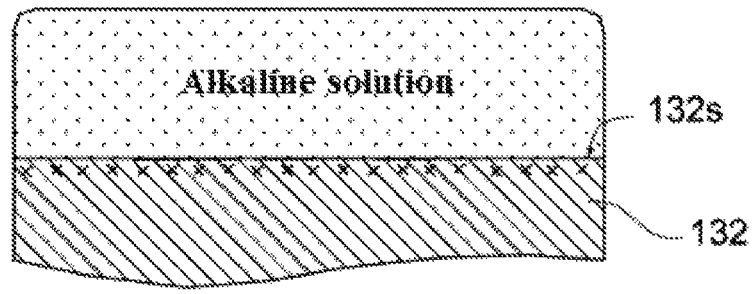

Next, alkaline solution is caused to come in contact with the principle surface 132s of the negative-electrode collector 132, as shown in FIG. 6B (ST02 of FIG. 5). This alkaline solution contains organic matter. The organic matter contains the carboxyl group, for example. Contacting of the alkaline solution is performed in atmosphere, for example. Contacting of the alkaline solution may be performed by spraying the alkaline solution over the principle surface 132s of the negative-electrode collector 132, or by immersing the negative-electrode collector 132 in the alkaline solution.

Figure 6C:
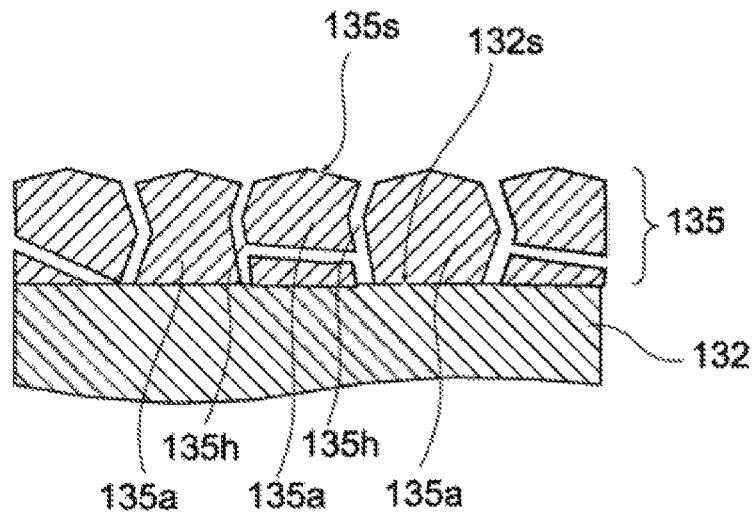

When the alkaline solution comes in contact with the negative-electrode collector 132, for example, the oxygen and hydroxyl group in the alkaline solution react with the aluminum in the negative-electrode collector 132, and consequently a negative-electrode aluminum oxide layer 135 is formed on the principle surface 132s of the negative-electrode collector 132. This condition is shown in FIG. 6C.

The negative-electrode aluminum oxide layer 135 is porous, for example. The negative-electrode aluminum oxide layer 135 contains aluminum hydroxide and aluminum oxide. Also, the negative-electrode aluminum oxide layer 135 has multiple voids 135h. The multiple voids 135h extend from the principle surface 135s of the negative-electrode aluminum oxide layer 135 to the principle surface 132s of the negative-electrode collector 132.

Figure 7A:
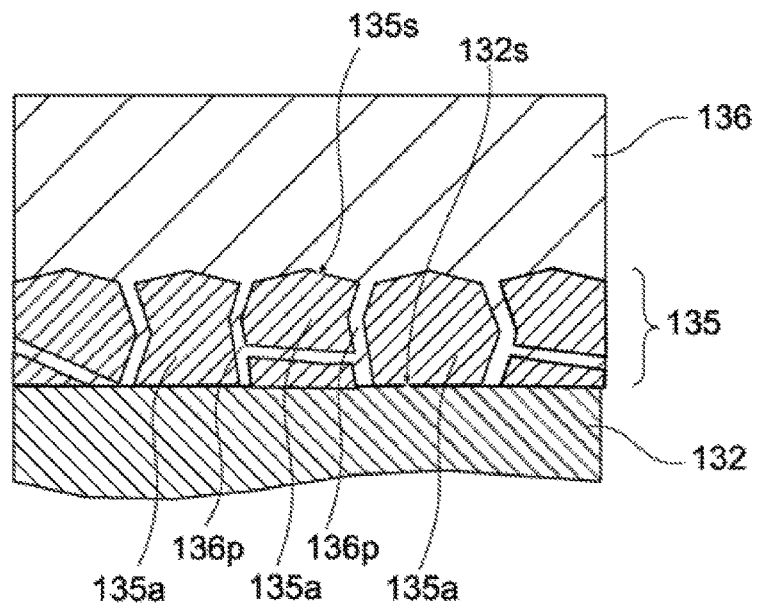
FIGS. 7A and 7B are cross sectional views showing the manufacturing process (continued from FIG. 6C) of an electrochemical device electrode pertaining to an embodiment of the present invention.

Next, as shown in FIG. 7A, conductive material is applied on the principle surface 135s of the negative-electrode aluminum oxide layer 135, and then this conductive material is dried (ST03 of FIG. 5). Application of the conductive material is performed in atmosphere, for example. This way, a negative-electrode conductive layer 136 is formed on the principle surface 135s of the negative-electrode aluminum oxide layer 135. Portions 136p of the negative-electrode conductive layer 136 enter the voids 135h, and portions 136p of the negative-electrode conductive layer 136 come in direct contact with the negative-electrode collector 132. It should be noted that alkaline conductive material may be used.

For the conductive material, any material having strong affinity with aluminum hydroxide and aluminum oxide is selected. For example, aqueous liquid in which a conductive substance is dispersed, is used for the conductive material. The conductive substance is at least one type of material selected from carbon black and graphite, for example.

Figure 7B:
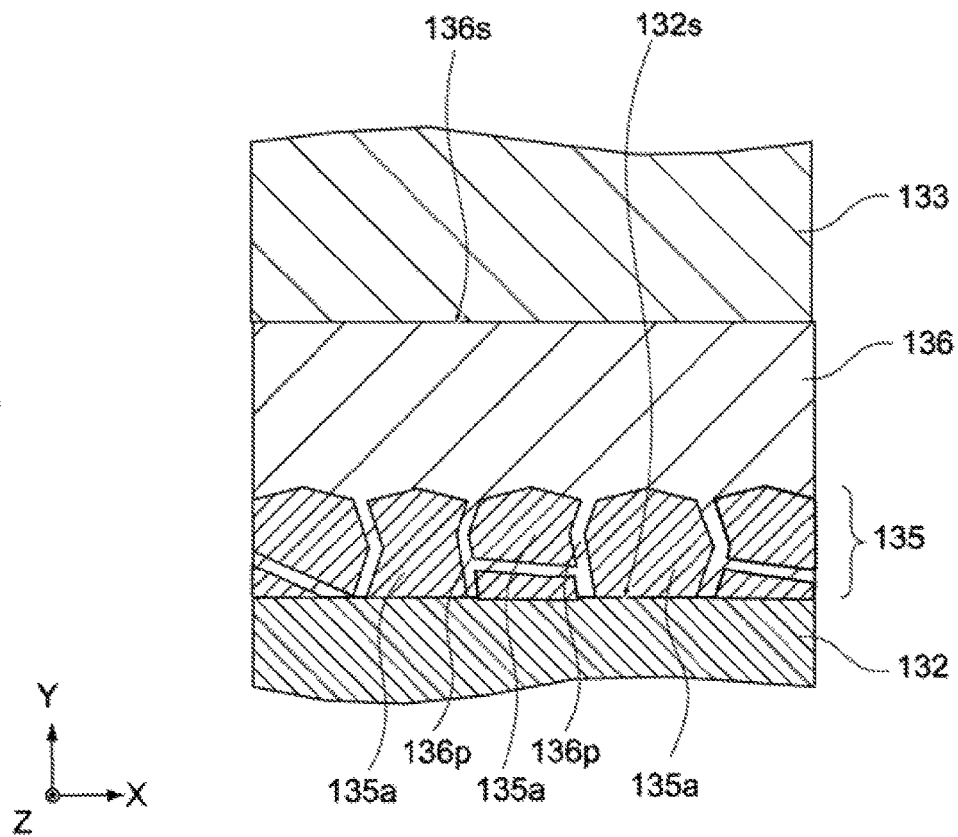

Next, as shown in FIG. 7B, a negative-electrode active material layer 133 is formed on the principle surface 136s of the negative-electrode conductive layer 136 (ST04 of FIG. 5). A negative electrode 130 is formed according to this manufacturing process (ST01 to ST04 of FIG. 5).

[Effects of the Negative Electrode and Positive Electrode]

In the negative electrode 130 pertaining to the present invention, the negative-electrode aluminum oxide layer 135 is formed on the negative-electrode collector 132. The negative-electrode aluminum oxide layer 135 contains aluminum hydroxide and aluminum oxide. The negative-electrode aluminum oxide layer 135 is porous.

This negative-electrode aluminum oxide layer 135 is formed under an alkaline condition (where pH is 8.0 or higher, for example). This way, the negative-electrode aluminum oxide layer 135 containing aluminum hydroxide and aluminum oxide is formed in a stable manner on the negative-electrode collector 132. Here, the oxygen (O) in the aluminum oxide, and the hydroxyl group (OH) in the aluminum hydroxide, bond strongly with the aluminum (Al) in the negative-electrode collector 132. As a result, the negative-electrode aluminum oxide layer 135 and the negative-electrode collector 132 adhere strongly to each other. The negative-electrode aluminum oxide layer 135 is formed in a stable manner on the negative-electrode collector 132 every time in multiple batch processes.

Also, in the negative electrode 130 pertaining to the present invention, the film thickness (such as 1 nm or more but no more than 2 μm) of the negative-electrode aluminum oxide layer 135 is greater than that of natural oxide film. Furthermore, portions 136p of the negative-electrode conductive layer 136 are in direct contact with the negative-electrode collector 132 via the negative-electrode aluminum oxide layer 135. This way, the negative-electrode conductive layer 136 and the negative-electrode aluminum oxide layer 135 adhere strongly to each other due to the anchoring effect of the negative-electrode aluminum oxide layer 135.

Also, the negative-electrode conductive layer 136 is formed on the negative-electrode aluminum oxide layer 135 by applying aqueous liquid in which a conductive substance is dispersed, onto the negative-electrode aluminum oxide layer 135. Here, the aqueous liquid has good affinity with aluminum hydroxide and aluminum oxide. As a result, this aqueous liquid efficiently wets and spreads over and into the principle surface 135s and voids 135h of/in the negative-electrode aluminum oxide layer 135.

This increases without fail the contact area between the negative-electrode conductive layer 136 whose aqueous liquid has been dried, and the negative-electrode aluminum oxide layer 135. This means that, under the present invention, the adhesion of the negative-electrode conductive layer 136 and the negative-electrode aluminum oxide layer 135 is increased by utilizing the anchoring effect as well as chemical affinity.

Furthermore, portions 136p of the negative-electrode conductive layer 136 are in direct contact with the negative-electrode collector 132 via the negative-electrode aluminum oxide layer 135. Because of this, the electrical resistance between the negative-electrode conductive layer 136 and the negative-electrode aluminum oxide layer 135 drops. As a result, the resistance between the negative-electrode active material layer 133 formed on the negative-electrode conductive layer 136, and the negative-electrode collector 132, also drops.

As describe above, with the negative electrode 130 pertaining to the present invention, the negative-electrode aluminum oxide layer 135 is formed between the negative-electrode conductive layer 136 and the negative-electrode collector 132. As a result, the resistance between the negative-electrode active material layer 133 and the negative-electrode collector 132 drops.

It should be noted that the structure of the positive electrode 140 is the same as that of the negative electrode 130, and that the same effects achieved by the negative electrode 130 are obtained with the positive electrode 140.

As a comparative example, a method whereby the negative-electrode conductive layer 136 is formed directly on the negative-electrode collector 132, without applying the aforementioned treatment 132tr to the negative-electrode collector 132, is presented. In this case, the presence of natural oxide film ($Al_2O_3$) formed on the principle surface 132s of the negative-electrode collector 132 degrades the wettability of the negative-electrode conductive layer 136.

As another comparative example, a method whereby corona discharge is performed on the principle surface 132s of the negative-electrode collector 132 and then this principle surface 132s is exposed to water, is presented. According to this method, however, it is possible that the water may turn acidic or alkaline depending on the manufacturing environment, in which case the aluminum hydroxide may not be formed on the negative-electrode collector 132 in a stable manner. Also, if the negative-electrode collector 132 is exposed to water again, aluminum oxide may form on one side of the negative-electrode collector 132. In this case, good wettability of the negative-electrode conductive layer 136 cannot be achieved, just like in the aforementioned comparative example.

Other Embodiments

In the aforementioned embodiment, an electrical double-layer capacitor was illustrated as the electrochemical device 100; however, the present invention is not limited to this embodiment. For example, the aforementioned embodiment may be applied to the positive electrode of a lithium ion capacitor. Alternatively, the aforementioned embodiment may be applied to an electrode of a lithium ion battery.

If the aforementioned embodiment is applied to a lithium ion capacitor, the negative-electrode collector 132 in the negative electrode 130 is a copper foil or other metal foil, for example. Also, the negative-electrode active material contained in the negative-electrode active material layer 133 is a material capable of occluding the lithium ions in the electrolytic solution, and for this material, non-graphitizing carbon (hard carbon), graphite, soft carbon, or other carbon material may be used, for example.

The binder resin in the negative electrode 130 is a synthetic resin that joins the negative-electrode active material, and carboxy methyl cellulose, styrene butadiene rubber, polyethylene, polypropylene, polyethylene terephthalate, aromatic polyamide, carboxy methyl cellulose, fluororubber, polyvinylidene fluoride, isoprene rubber, butadiene rubber, ethylene propylene rubber, etc., may be used, for example.

The conductive auxiliary agent is constituted by particles made of conductive material, and improves the conductivity within the negative-electrode active material. The conductive auxiliary agent may be acetylene black, graphite, carbon black or other carbon material, for example. Any one of the foregoing may be used alone, or two or more of them may be mixed together. It should be noted that the conductive auxiliary agent may be constituted by metal material, conductive high polymer, etc., so long as the material used conducts electricity.

The negative-electrode active material layer 133 may be provided directly on the negative-electrode collector 132, or it may be provided on the negative-electrode conductive layer 136 provided on the negative-electrode collector 132.

EXAMPLE

A more specific example is explained below.

For the current collector (negative-electrode collector 132 or positive-electrode collector 142), an aluminum foil is selected. The surface of the aluminum foil is treated with corona discharge (output 0.8 kW), after which a weak alkaline solution containing organic matter (pH 8.0) is sprayed over the aluminum foil. The weak alkaline solution may be 1% aqueous solution of CMC (carboxy methyl cellulose).

For the weak alkaline solution, a solution prepared by dissolving carboxyl salt, which is either salt of carboxy methyl cellulose sodium (Na) or salt of carboxy methyl cellulose ammonium ($NH_3$), in water, is used. Thereafter, the aluminum foil is heated to 50° C. or higher (such as 50° C. or higher but no higher than 60° C.), to dry the weak alkaline solution. As a result, an aluminum oxide layer (negative-electrode aluminum oxide layer 135 or positive-electrode aluminum oxide layer 145) is formed on the current collector.

Figure 8A:
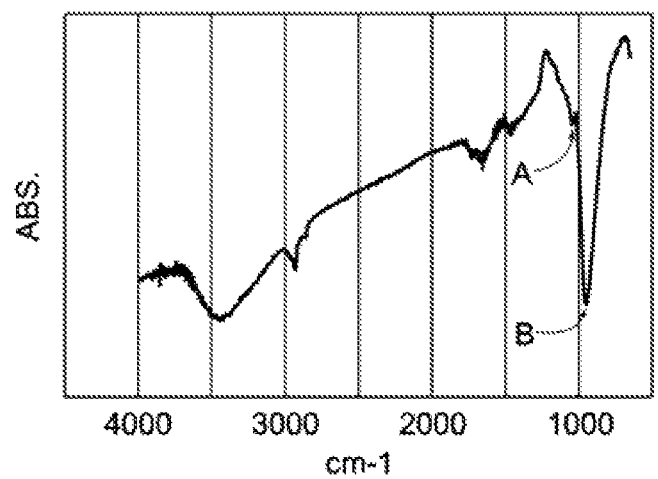
FIGS. 8A, 8B, and 8C are graphs showing infrared absorption spectra.
Figure 8B:
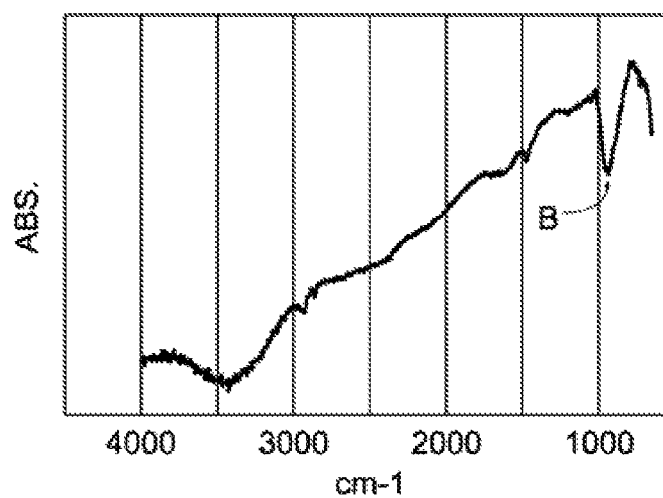
Figure 8C:
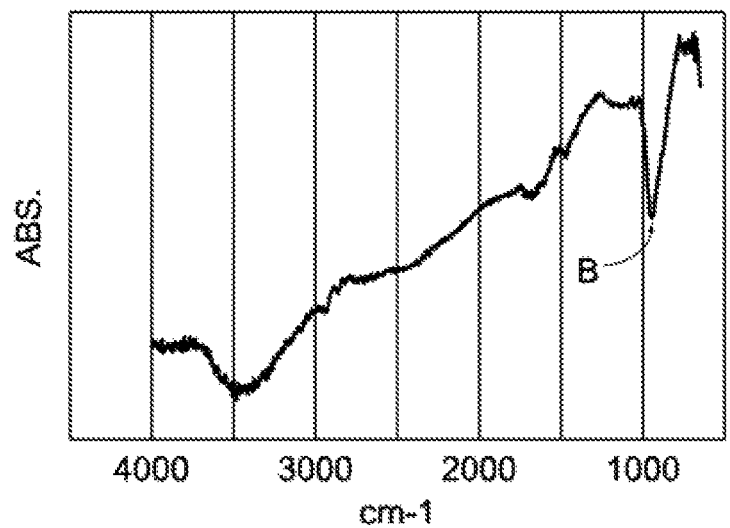

FIGS. 8A to 8C are graphs showing infrared absorption spectrums.

In FIGS. 8A to 8C, the horizontal axis represents wave number ($cm^{-1}$), while the vertical axis represents absorption strength (ABS (standard value)).

FIG. 8A shows an infrared absorption spectrum (FT-IR) of the aluminum oxide layer formed according to the aforementioned method. In the aluminum oxide layer formed according to the aforementioned method, an absorption peak A (transmission valley) due to aluminum hydroxide is confirmed near 1040 $cm^{-1}$, as shown in FIG. 8A. Also, an absorption peak B (transmission valley) due to aluminum oxide is confirmed near 950 $cm^{-1}$.

FIG. 8B shows an infrared absorption spectrum of the aluminum foil surface before the corona discharge treatment. In this example, no absorption peak A due to aluminum hydroxide was confirmed (near 1040 $cm^{-1}$), as shown in FIG. 8B.

Also, FIG. 8C shows an infrared absorption spectrum of the aluminum foil surface following the corona discharge treatment of the aluminum foil and spraying of water. Again, in this example, no absorption peak A due to aluminum hydroxide was confirmed (near 1040 $cm^{-1}$), as shown in FIG. 8C.

Accordingly, it was found that the absorption peak A shown in FIG. 8A occurred as a result of causing the aluminum foil treated with corona discharge to contact the 1% aqueous solution of CMC. Now, in FIG. 8A, the absorption peak B due to aluminum oxide is at least twice as high as, but no higher than six times the absorption peak A due to aluminum hydroxide, with a wave number of 1300 $cm^{-1}$ or less.

If the absorption peak B is lower than twice the absorption peak A, the hydrophilicity will drop, which is not desirable. If the absorption peak B is higher than six times the absorption peak A, on the other hand, the current collector resistance will rise, which is not desirable, either.

FIG. 9 is a table showing an ESR (equivalent series resistance) comparison.

Two capacitor electrodes were prepared as samples. For example, an electrode was prepared by applying water-based conductive paint on the aforementioned aluminum oxide layer and then drying the layer, and applying active material slurry and then drying the layer again (Example α). As another sample, an electrode was prepared by applying only conductive paint on an aluminum foil that had been degreased (Comparative Example β). Both electrodes were used for a cylindrical capacitor 4F.

As shown in FIG. 9, the initial ESR was 207 (mΩ) in Comparative Example β, but it was 163 (mΩ) in Example α, meaning that the ESR in Example α was lower than in Comparative Example β (21% lower). Furthermore, while the ESR rose 580% from the initial value following the acceleration test (float test, 1000 hours) in Comparative Example β, the corresponding rise was 450% in Example α, being smaller than in Comparative Example β.

As described above, aluminum oxide and aluminum hydroxide coexist in the aluminum oxide layer in this example. This improves the wettability of the conductive layer and the aluminum oxide layer, which in turn improves the adhesion between the conductive layer and the aluminum oxide layer. As a result, the resistance between the conductive layer and the aluminum oxide layer drops.

The foregoing explained an embodiment of the present invention; however, it should be noted that the present invention is not limited to the aforementioned embodiment, and it goes without saying that various modifications can be made thereto.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-111228, filed Jun. 2, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. An electrochemical device electrode, comprising:
a current collector which is an aluminum foil;
an aluminum oxide layer which is formed on and in contact with a principle surface of the current collector and contains aluminum hydroxide and aluminum oxide, wherein, according to an infrared absorption spectrum of the aluminum oxide layer with a wave number of 1300 $cm^{-1}$ or less, an absorption peak near 950 $cm^{-1}$ due to the aluminum oxide is at least twice as high as, but no higher than six times, an absorption peak near 1040 $cm^{-1}$ due to the aluminum hydroxide;
a conductive layer which is formed on and in contact with the aluminum oxide layer and contains conductive material; and
an active material layer which is formed on and in contact with the conductive layer.

2. The electrochemical device electrode according to claim 1, wherein the aluminum oxide layer has a thickness of 1 nm or more but no more than 2 μm.

3. The electrochemical device electrode according to claim 2, wherein the aluminum oxide layer is porous.

4. The electrochemical device electrode according to claim 1, wherein the aluminum oxide layer is porous.

5. A method for manufacturing an electrochemical device electrode, characterized by comprising:
applying a treatment for improving a reactivity of a principle surface of a current collector being an aluminum foil;
causing an alkaline solution to come in contact with the principle surface of the current collector, to form an aluminum oxide layer containing aluminum hydroxide and aluminum oxide on the principle surface of the current collector, wherein, according to an infrared absorption spectrum of the aluminum oxide layer with a wave number of 1300 $cm^{-1}$ or less, an absorption peak near 950 $cm^{-1}$ due to the aluminum oxide is at least twice as high as, but no higher than six times, an absorption peak near 1040 $cm^{-1}$ due to the aluminum hydroxide;
applying a conductive material on a principle surface of the aluminum oxide layer, and then drying the conductive material, to form a conductive layer on the principle surface of the aluminum oxide layer; and
forming an active material layer on a principle surface of the conductive layer.

6. A method for manufacturing an electrochemical device electrode according to claim 5, wherein the aluminum oxide layer is formed as a result of aqueous alkaline solution in which carboxyl salt is dissolved, coming in contact with the current collector.

7. A method for manufacturing an electrochemical device electrode according to claim 6, wherein, for the conductive material, aqueous liquid in which conductive substance is dispersed is used.

8. A method for manufacturing an electrochemical device electrode according to claim 5, wherein, for the conductive material, aqueous liquid in which conductive substance is dispersed is used.

* * * * *